(12) United States Patent
Inao et al.

(10) Patent No.: US 10,286,857 B2
(45) Date of Patent: May 14, 2019

(54) WIRE HARNESS

(71) Applicant: Yazaki Corporation, Minato-ku, Tokyo (JP)

(72) Inventors: Shinichi Inao, Makinohara (JP); Hideomi Adachi, Makinohara (JP); Masahisa Sugimoto, Susono (JP)

(73) Assignee: Yazaki Corporation, Minato-ku, Tokyo (JP)

( * ) Notice: Subject to any disclaimer, the term of this patent is extended or adjusted under 35 U.S.C. 154(b) by 0 days.

(21) Appl. No.: 14/739,550

(22) Filed: Jun. 15, 2015

(65) Prior Publication Data

US 2015/0274095 A1    Oct. 1, 2015

Related U.S. Application Data

(63) Continuation of application No. PCT/JP2013/084542, filed on Dec. 24, 2013.

(30) Foreign Application Priority Data

Dec. 25, 2012 (JP) .................................. 2012-280887
Jul. 4, 2013 (JP) .................................. 2013-140324

(51) Int. Cl.
*B60R 16/02* (2006.01)
*H02G 3/04* (2006.01)

(52) U.S. Cl.
CPC ....... *B60R 16/0215* (2013.01); *H02G 3/0468* (2013.01)

(58) Field of Classification Search
CPC .................................................. B60R 16/0215
USPC ........................................................ 174/72 C
See application file for complete search history.

(56) References Cited

U.S. PATENT DOCUMENTS

| 6,051,789 | A | * | 4/2000 | Kato | ................ | B29C 47/0023 |
| | | | | | | 138/121 |
| 6,129,120 | A | | 10/2000 | Margot | | |
| 6,164,338 | A | * | 12/2000 | Holzer | ................ | F16L 3/26 |
| | | | | | | 138/106 |
| 6,642,454 | B2 | * | 11/2003 | Mercier | ................ | H02G 3/06 |
| | | | | | | 174/135 |
| 7,064,277 | B1 | * | 6/2006 | Lique | ................ | H01B 11/06 |
| | | | | | | 174/113 C |
| 7,378,592 | B2 | * | 5/2008 | Suzuki | ................ | B60R 16/0215 |
| | | | | | | 174/135 |

(Continued)

FOREIGN PATENT DOCUMENTS

| CN | 1193836 A | 9/1998 |
| EP | 0954077 A2 | 11/1999 |

(Continued)

OTHER PUBLICATIONS

Jan. 28, 2014—(WO) Written Opinion of the ISA—App PCT/JP2013/084542, Eng Tran.

(Continued)

*Primary Examiner* — Stanley Tso
(74) *Attorney, Agent, or Firm* — Banner & Witcoff, Ltd.

(57) ABSTRACT

An outer cover is made of resin, and includes a flexible tube portion having flexibility and a straight tube portion to be arranged in a straight manner. At least one of the flexible tube portion and the straight tube portion has differently shaped sections contiguously formed along a tube axial direction.

11 Claims, 9 Drawing Sheets

(56) References Cited

U.S. PATENT DOCUMENTS

| | | | |
|---|---|---|---|
| 8,525,029 B2 | 9/2013 | Kato et al. | |
| 2002/0194732 A1* | 12/2002 | Tadokoro | H02G 3/0468 29/868 |
| 2006/0090920 A1* | 5/2006 | Fujita | B60R 16/0207 174/72 A |
| 2006/0278423 A1* | 12/2006 | Ichikawa | B60R 16/0215 174/72 A |
| 2010/0037972 A1* | 2/2010 | Palmeri | F16L 11/11 138/121 |
| 2011/0127084 A1 | 6/2011 | Ichikawa et al. | |
| 2011/0155458 A1* | 6/2011 | Kato | B60R 16/0215 174/74 R |
| 2013/0248038 A1 | 9/2013 | Aoyama et al. | |
| 2014/0238740 A1* | 8/2014 | Inoue | H02G 11/006 174/72 A |

FOREIGN PATENT DOCUMENTS

| | | |
|---|---|---|
| EP | 2101095 A2 | 9/2009 |
| JP | H05-332479 A | 12/1993 |
| JP | H10-096486 | 4/1998 |
| JP | H10-257634 A | 9/1998 |
| JP | H11-325344 A | 11/1999 |
| JP | 2001-251736 A | 9/2001 |
| JP | 2006-014398 A | 1/2006 |
| JP | 2009-143326 A | 7/2009 |
| JP | 2010-047033 A | 3/2010 |
| JP | 2011-150991 A | 8/2011 |
| JP | 2012-085451 A | 4/2012 |
| JP | 2012-252976 A | 12/2012 |
| WO | 2012-086686 A1 | 6/2012 |
| WO | 2012169158 A1 | 12/2012 |

OTHER PUBLICATIONS

Jan. 28, 2014—International Search Report—Intl App. PCT/JP2013/084542.
Jul. 26, 2016—(EP) Extended European Search Report—App 13868310.7.
Oct. 17, 2016—(CN) The First Office Action—App 201380068032.9.
May 26, 2017—(EP) Office Action—App 13868310.7.
Feb. 28, 2017—(JP) Notification of Reasons for Refusal—App 2013-140324, Eng Tran.
May 3, 2017—(CN) The Second Office Action—App 201380068032.9.
Sep. 12, 2017—(JP) Decision of Refusal—App 2013-140324, Eng Tran.
Apr. 9, 2018—(EP) Office Action—App 13868310.7.
Aug. 15, 2018—(EP) Office Action—App 13868310.7.

* cited by examiner

WIRE HARNESS

CROSS REFERENCE TO RELATED APPLICATIONS

This application is a continuation of International Patent Application No. PCT/JP2013/084542 filed on Dec. 24, 2013, claiming priority from Japanese Patent Application No. 2012-280887 filed on Dec. 25, 2012 and Japanese Patent Application No. 2013-140324 filed on Jul. 4, 2013, the contents of which are incorporated herein by reference.

FIELD OF INVENTION

The present invention relates to a wire harness including an electrically-conducting path and a resin outer cover in which the electrically-conducting path is inserted.

BACKGROUND ART

As conventional wire harnesses, there is known for example a wire harness that electrically connects high-tension (i.e., high-voltage) devices installed in a hybrid electric vehicle or in an electric vehicle.

A wire harness disclosed in Patent Document 1 identified below includes a plurality of electrically-conducting paths, a resin corrugated tube accommodating the plurality of electrically-conducting paths collectively, and a resin protector. This wire harness is arranged so as to extend under a floor of a vehicle.

The wire harness is divided into circuit portions, and these divided circuit portions are arranged to extend under the floor of the vehicle so as to ensure a certain distance from the ground. In this wire harness, the divided circuit portions are individually accommodated in corresponding flat corrugated tubes to be so arranged.

Patent Document 1: JP2010-47033A

The conventional wire harness described above is configured to have a structure that can address the routing space. However, in view of the recent trends, a further consideration is required. This is because there is a possibility that a wire harness has to be arranged through a space which is getting narrower than the conventional routing space or a three-dimensional complex space. Regulating the routing of a wire harness should also be taken into consideration.

SUMMARY OF INVENTION

The invention has been made in view of these situations, and an object thereof is to provide a wire harness which takes into consideration the routing space and routing regulation.

With a view to achieving the object, a wire harness according to the present invention has the following features (1) to (7).

(1) A wire harness including a plurality of lines or circuits of electrically-conducting paths and a tube-shaped outer cover in which the electrically-conducting paths are inserted to protect the electrically-conducting paths, wherein the outer cover is made of resin and includes a flexible tube portion having flexibility and a straight tube portion to be arranged in a straight manner, and wherein at least one of the flexible tube portion and the straight tube portion has a plurality of differently shaped sections contiguously formed along a tube axial direction.

According to the wire harness of (1) described above, in case for example, a corrugated tube is adopted as the flexible tube portion and a rigid straight tube is adopted as the straight tube portion, an effective routing regulation of the wire harness can be realized without using a routing regulating member such as a protector. In addition, according to the wire harness of (1) described above, due to the outer cover having the differently shaped sections, for example, the arrangement of the plurality of electrically-conducting paths can be changed according to the shapes of the differentially shaped portions. This enables the wire harness to be arranged through even a narrow space or a three-dimensional complex space. As a result, according to the wire harness of (1) described above, it is possible to provide the wire harness that can address the routing space or routing regulation.

(2) The wire harness according to (1) described above, wherein the differently shaped sections are configured to be different in one or a combination of two or more of a cross-sectional shape, size and twisted orientation.

According to the wire harness of (2) described above, the differentially shaped portions can be formed on the outer cover by changing the shape, size and/or orientation. As a result, according to the wire harness of (2) described above, it is possible to provide the wire harness that can address the routing space by forming the differently shaped sections on the outer cover by changing the shape, size and/or orientation.

(3) The wire harness according to (1) or (2) described above, wherein the differently shaped sections are formed after the electrically-conducting paths are inserted through the outer cover.

According to the wire harness of (3) described above, after the plurality of lines or circuits of electrically-conducting paths is inserted through the outer cover, the differently shaped sections are formed on the outer cover, for example, by heating to collapse the outer cover. Because of this, according to the wire harness of (3) described above, it is possible to form differentially shaped portions of various shapes, sizes and orientations without preparing many molds for molding the outer cover. As a result, according to the wire harness of (3) described above, in forming differently shaped sections on the outer cover, the formation thereof is executed after the plurality lines or circuits of electrically-conducting paths is inserted through the outer cover, this facilitating the inserting operation of the electrically-conducting paths into the outer cover. Additionally, it is possible to reduce the number of molds for molding the outer cover to a minimum number.

(4) The wire harness according to (1) or (2) described above, wherein the differently shaped sections are formed before the electrically-conducting paths are inserted through the outer cover.

According to the wire harness of (4) described above, the differently shaped sections can be formed at the same time as the outer cover is resin molded. As a result, according to the wire harness of (4) described above, in forming differently shaped sections on the outer cover, the formation thereof is executed before the plurality of lines or circuits of electrically-conducting paths is inserted through the outer cover, this enabling the differently shaped sections to be formed without considering the electrically-conducting paths. Additionally, according to the wire harness of (4) described above, since the differently shaped sections are formed with no post-working required, the process involved in relation to the outer cover can be simplified.

(5) The wire harness according to any one of (1) to (4) described above, wherein the outer cover has a branching portion to divide the electrically-conducting paths at an intermediate portion of the differently shaped sections.

According to the wire harness of (5) described above, the branching portion can be formed by using the intermediate portion of the differently shaped sections. As a result of this, according to the wire harness of (5) described above, the electrically-conducting paths can be easily divided by using the intermediate portion of the differently shaped sections. Additionally, with respect to the outer cover, it is possible to cope with the branching of the electrically-conducting paths with a small number of configurations.

(6) The wire harness according to (5) described above, wherein the outer cover further includes a branched side protecting tube portion extending from the branching portion.

According to the wire harness of (6) described above, the electrically-conducting path branching off at the branching portion is inserted through the branched side protecting tube portion, whereby the branched-off electrically-conducting path can also be protected. Additionally, according to the wire harness of (6) described above, with respect to the outer cover, it is possible to cope with the branching of the electrically-conducting paths only by further including the branched side protecting tube portion. As a result, according to the wire harness of (6) described above, the branching of the electrically-conducting paths can be facilitated by using the intermediate portion of the differently shaped sections. Additionally, with respect to the outer cover, it is possible to cope with the branching of the electrically-conducting paths with a small number of configurations.

(7) The wire harness according to any one of (1) to (6) described above, wherein the electrically-conducting paths are configured in an elongated manner to be arranged under a floor of a vehicle to extend from a front to a rear of the floor of the vehicle, and wherein the outer cover is configured to have a length that corresponds to the electrically-conducting paths.

According to the wire harness of (7) described above, by forming the differently shaped sections on the outer cover, the wire harness can be adopted as an elongated wire harness for an automobile that can be arranged through a narrow space or a three-dimensional complex space under the floor of the vehicle or at the front and rear of an under side of the floor of the vehicle. As a result, according to the wire harness of (7) described above, by forming the differently shaped sections so as to match the routing spaces under the floor of the vehicle and/or at the front and rear of the underside of the floor of the vehicle, the wire harness can be adopted as an elongated wire harness for an automobile.

EMBODIMENTS OF INVENTION

In a wire harness according to an embodiment of the invention, a plurality of electrically-conducting paths are inserted through an outer cover of a tubular shape. In the wire harness, differently shaped section are contiguously formed on the outer cover in the direction of an axis of the tubular outer cover so that the wire harness can be laid out or arranged through even a narrow space or a three-dimensional complex space.

A branching portion to divide the electrically-conducting paths is formed at an intermediate portion of the differently shaped sections. The electrically-conducting path branched off from the branching portion is protected by a branched side protecting tube portion.

Figure 1:
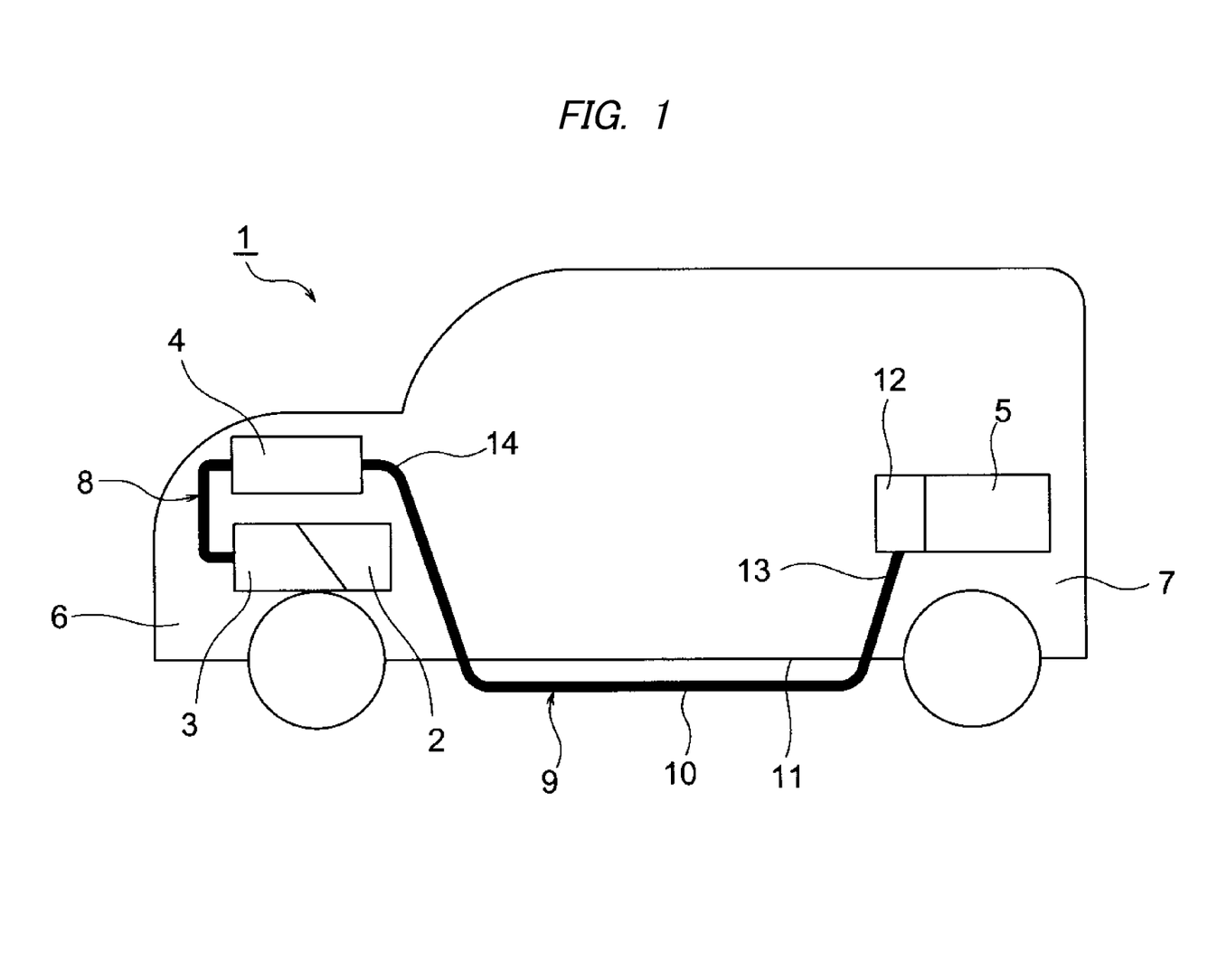
FIG. 1 is a schematic view showing a routing of a wire harness according to an embodiment of the invention.
Figure 2:
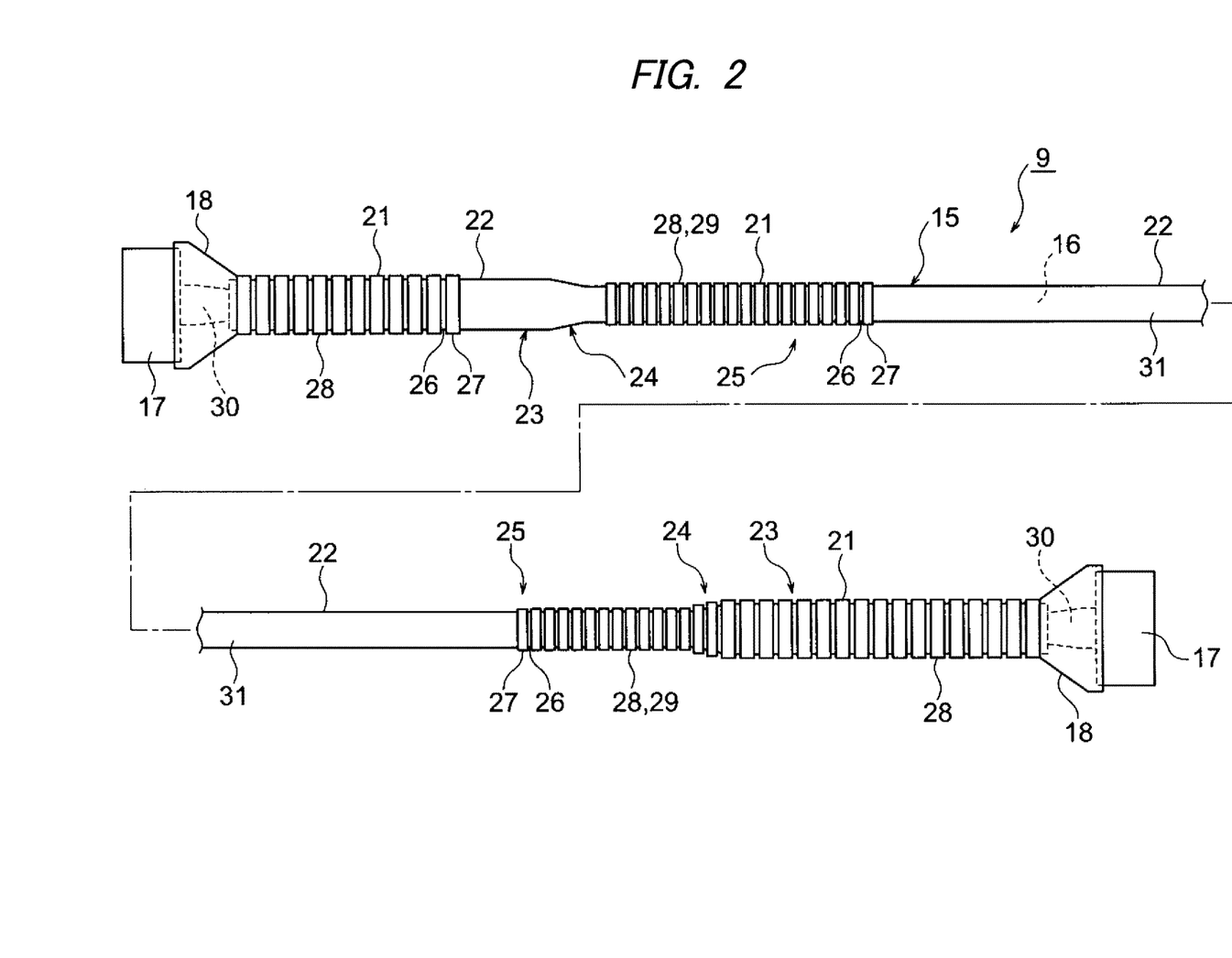
FIG. 2 is a side view of the wire harness shown in FIG. 1.
Figure 3:
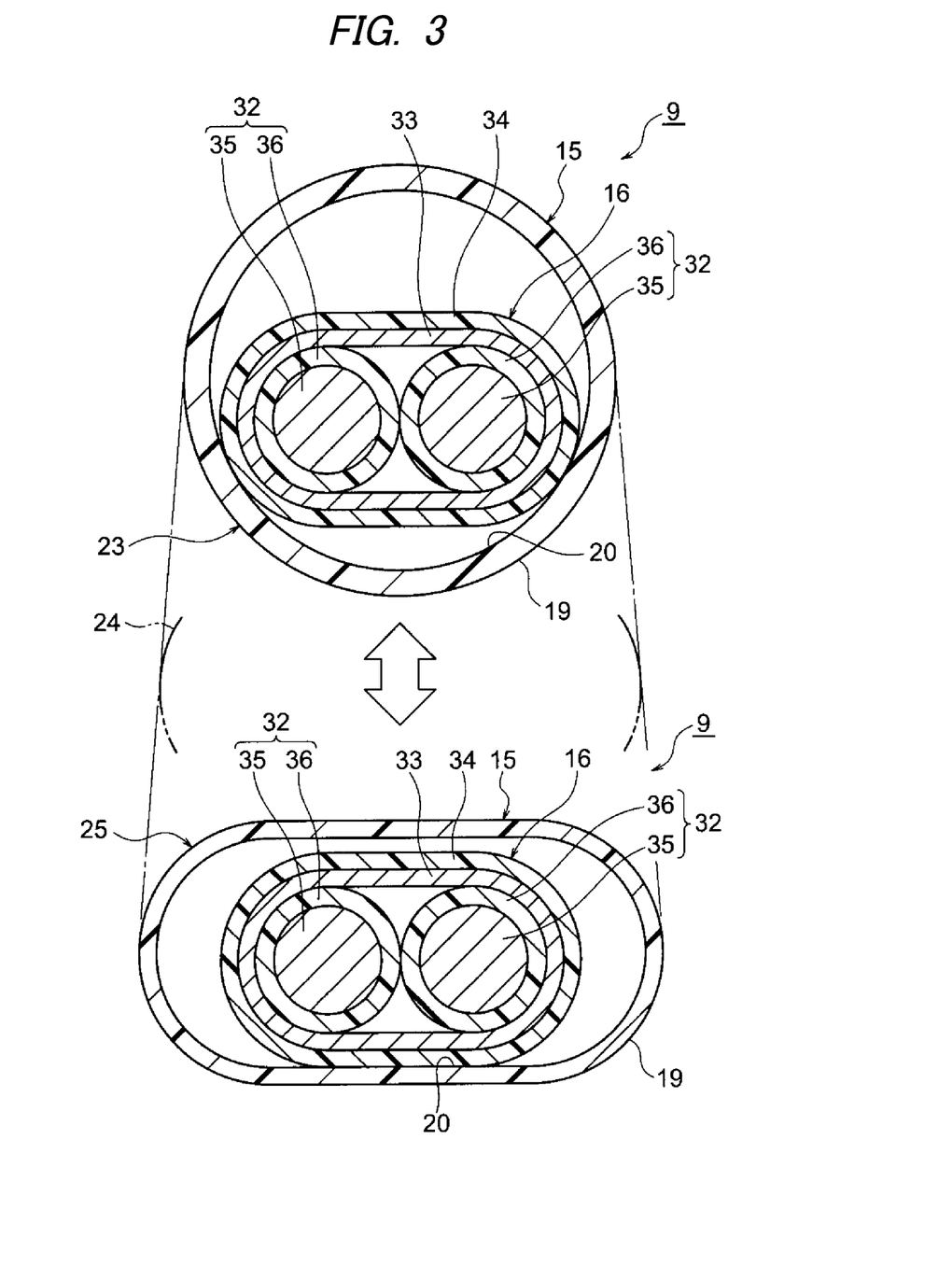
FIG. 3 is a schematic view showing schematically a change in cross section of the wire harness shown in FIG. 2, as well as respective cross sections of differently shaped sections.

Hereinafter, referring to the drawings, a wire harness according to an embodiment of the invention will be described. FIG. 1 is a schematic view showing a routing of the wire harness of the embodiment. FIG. 2 is a side view of the wire harness shown in FIG. 1. FIG. 3 is a schematic view showing schematically a change in cross section of the wire harness shown in FIG. 2, as well as cross sections of differently shaped sections. FIGS. 4 to 8B are schematic views showing schematically cross sections of wire harnesses of modified examples. FIGS. 9A and 9B are views showing a fabricating apparatus for an outer cover.

In this embodiment, the invention will be described as being applied to a wire harness which is laid out or arranged in a hybrid electric vehicle (the invention may also be applied to an electric vehicle or a general automotive vehicle.).

In FIG. 1, reference numeral 1 denotes a hybrid electric vehicle. The hybrid electric vehicle 1 is a vehicle which is driven by a combination of an engine 2 and a motor unit 3. Electric power from a battery 5 (in other words, a battery pack) is supplied to the motor unit 3 via an inverter unit 4. In this example, the engine 2, the motor unit 3 and the inverter unit 4 are installed in an engine compartment 6 which is situated near front wheels. The battery 5 is installed in a vehicle rear portion 7 which is situated near rear wheels. The battery 5 may be installed in a vehicle passenger compartment which is situated at the rear of the engine compartment 6.

The motor unit 3 and the inverter unit 4 are electrically connected by a high-voltage wire harness 8. The battery 5 and the inverter unit 4 are electrically connected by a high-voltage wire harness 9. The wire harness 9 is formed long, and an intermediate portion 10 is arranged under a vehicle floor 11. The wire harness 9 (in other words, a high-voltage conduction path 16 and an outer cover 15) is arranged under the vehicle floor 11 so as to extend from a front to a rear of the vehicle floor 11 therealong and substantially parallel thereto. The vehicle floor 11 is a known body and is a so-called panel member. Through holes (not shown) are formed in predetermined positions on the vehicle floor 11. The wire harness 9 is passed through these through holes in a water-tight fashion. The wire harness 9 is arranged from the engine compartment 6 which is disposed at a front side of the vehicle floor 11 to an exterior portion of the passenger compartment through the through hole and is thereafter arranged to extend from the front to the rear of the vehicle floor 11. Thereafter, the wire harness 9 is arranged again into an interior portion of the passenger compartment through the through hole and is then arranged to the vehicle rear portion 7 which is disposed at the rear side of the vehicle floor 11.

The wire harness 9 and the battery 5 are electrically connected via a junction block 12 which is provided on the battery 5. A rear end 13 of the wire harness 9 is connected electrically to the junction block 12 by a known method. A front end 14 of the wire harness 9 is connected electrically to the inverter unit 4 by a known method.

The motor unit 3 has a motor (not shown) and a generator (not shown). The inverter unit 4 has an inverter (not shown) and a converter (not shown). The motor unit 3 is formed as a motor assembly including a shielding case (not shown). The inverter unit 4 is also formed as an inverter assembly including a shielding case (not shown). The battery 5 is a Ni-metal hydride battery module or a Lithium ion battery module. For example, a battery device such as a capacitor can also be used as the battery 5. There is imposed no specific limitation on the battery 5, provided that the battery 5 can be used in the hybrid electric vehicle 1 or an electric vehicle.

In FIG. 2, the wire harness 9 includes an outer cover 15, a high-voltage conduction path 16 (that is, an electrically-conducting path) which is accommodated in the outer cover 15 for protection, shielded connectors 17 and boots 18 which are provided at ends of the high-voltage conduction path 16, a plurality of clamps (that is, fixing members, not shown) attached to an outer surface of the outer cover 15, and a grommet (that is, a water-stopping member, not shown) which is attached similarly to the outer surface of the outer cover 15 in a water-tight fashion.

The wire harness 9 may be configured and constructed so that a low-voltage electrically-conducting path is accommodated in the outer cover 15 together with the high-voltage conduction path 16 for protection.

In FIGS. 2 and 3, the outer cover 15 is a resin tube member covering the high-voltage conduction path 16 and is configured to have sufficient length for accommodating the high-voltage conduction path 16 extending therethrough and a sufficient thickness to protect the high-voltage conduction path 16. The outer cover 15 is also formed with no seam or slit which communicates from the outer surface 19 to an inner surface 20 thereof. The outer cover 15 is formed into a shape which can keep the high-voltage conduction path 16 away from exterior water (that is, can prevent the intrusion of exterior water). The outer cover 15 is configured to have a length that corresponds to the length of the high-voltage conduction path 16.

The outer cover 15 has a plurality of flexible tube portions 21 having flexibility and a plurality of straight tube portions 22 which constitute portions which are arranged straight and is formed into a shape like, for example, one shown in FIGS. 2 and 3. The outer cover 15 has differently shaped sections 23-25 contiguously formed along a tube axial direction and is formed similarly into a shape like, for example, the one shown in FIGS. 2 and 3.

The flexible tube portions 21 and the straight tube portions 22 are integrally resin molded so that the whole of the outer cover 15 becomes straight with the flexible tube portions 21 kept not deflected or straight. The flexible tube portions 21 and the straight tube portions 22 are formed so as to be disposed continuously in an alternating fashion in the tube axial direction.

The flexible tube portions 21 are disposed in positions where the outer cover has to match its shape with a shape of a portion of the vehicle where the outer cover is attached (that is, a shape of a portion of the vehicle where the wire harness is arranged and a shape of a portion of the vehicle where the wire harness is fixed). The flexible tube portions 21 are also formed so long as to match the lengths of portions of the vehicle where the flexible tube portions 21 are attached.

By making different the lengths of the flexible tube portions 21 in the tube axial direction, the flexible tube portions 21 can be deflected over lengths required to match the shapes of portions of the vehicle where the flexible tube portions 21 are attached. The flexible tube portions 21 formed as described above can individually be deflected at desired angles when the wire harness 9 is packed or transported or when the wire harness 9 is arranged on the vehicle.

The flexible tube portions 21 can not only be deflected to be bent but also be returned to their original straight shape as a matter of course.

In this embodiment, the flexible tube portions 21 are formed into a corrugated tubular shape. There is imposed no specific limitation on the shape of the flexible tube portions 21, provided that the flexible tube portions 21 have the flexibility. Specifically speaking, the flexible tube portion 21 has concave portions 26 and convex portions 27 which both extend in a circumferential direction, and these concave portions 26 and convex portions 27 are alternately and contiguously formed in the tube axial direction.

The flexible tube portion 21 includes routing flexible tube portions 28 which are deflected when the wire harness 9 is arranged and packaging and transporting flexible tube portions 29 which are deflected when the wire harness 9 is packed and transported. The flexible tube portion 21 may be disposed at a portion which does not have to be deflected.

The outer cover 15 is formed into a shape in which the flexible tube portions 21 are disposed at ends thereof. A soft waterproof member which extends as far as the shielded connector 17 is attached to an end portion of the flexible tube portion 21 which is disposed at each of the ends of the outer cover 15. For example, a rubber boot 18 is raised as the waterproof member. The boot 18 is attached so as to cover an end portion 30 of the high-voltage conduction path 16 which is pulled out of the end portion of the flexible tube portion 21 or an opening portion at the end portion of the flexible tube portion 21. The attachment of the waterproof member is arbitrary. A tape wrapped portion which is formed by winding a tape having waterproofness is raised as a substitute for the boot 18.

The outer cover 15 is formed into a configuration in which portions where the flexible tube portions 21 are disposed are formed into corrugated tubes. In other words, the outer cover 15 is formed into a configuration in which corrugated tubes are present partially. Since it has the corrugated tube portions as described above, the outer cover 15 can also be regarded as a "corrugated tube" or a "partial corrugated tube."

The outer cover 15 is configured such that no slit is provided along the tube axial direction thereof (in other words, no axial separation is provided in a body thereof). The reason that no slit is provided is that the intrusion of water into the outer cover 15 is prevented so as to enhance the waterproofness thereof. Additionally, the reason for no slit is that for the high-voltage conduction path 16 is prevented from projecting from, for example, a portion of the outer cover 15 which is deflected. Further, the reason is that the rigidity of the outer cover 15 itself is enhanced. Additionally, the outer cover 15 can also be formed into a configuration in which no circumferential slit is provided. The reason that the outer cover 15 is so formed is the same as the reason that no slit is provided.

As long as points raised as the reasons that the outer cover 15 is formed into the configurations described above are satisfied, the outer cover 15 may be formed into a configuration in which the outer cover 15 is separated in a predetermined position. As this occurs, individual separated portions of the outer cover 15 are put together through bonding or fusing, or by a post-fitted member for connecting them together.

The straight tube portions 22 are formed as a portion which has no flexibility like the one which the flexible tube portions 21 have. Namely, the flexibility of the straight tube portions 22 is smaller than the flexibility of the flexible tube portions 21. The straight tube portions 22 configured are formed as a portion which is not bent when the wire harness 9 is packed and transported or when the wire harness 9 is arranged. The portion which is not bent means a portion which is difficult to be bent and hence means a portion to which the flexibility is not imparted in a positive fashion. The straight tube portions 22 are formed in a straight tubular shape. Consequently, the straight tube portions 22 can be regarded as a "straight tube portion." In addition to this, the straight tube portions 22 can also be regarded as an "inflexible tube portion." The straight tube portions 22 are formed into a more rigid portion than the flexible tube portions 21. The straight tube portions 22 are also formed into configurations which match locations and lengths of portions of the vehicle where the straight tube portions 22 are attached.

The outer cover 15 has, as one type of the straight tube portion 22, an under-floor straight tube portion 31 which is arranged under the vehicle floor 11 (see FIG. 1). This under-floor straight tube portion 31 is formed long since it is arranged under the vehicle floor 11 (since it is arranged so as to follow, for example, a reinforcement).

The differently shaped sections 23-25 formed along the tube axial direction are formed as portions to be arranged through a narrow space or a three-dimensional complex space. The plurality of differently shaped sections 23-25 are contiguously formed along the tube axial direction such that the cross-sectional shape changes along the tube axial direction. To describe this specifically, as shown in FIG. 3, the differently shaped section 23 is formed so that its cross section becomes circular. The differently shaped section 24 is formed so that its cross section changes from a circular shape to an elliptic one (that is, changes from an elliptic shape to a circular one). Further, the differently shaped section 25 is formed so that its cross section becomes elliptic. In other words, the differently shaped section 23 is formed circular, and the differently shaped section 25 is formed flat.

As is seen from what has been described above, the outer cover 15 is formed so that its cross section changes along the tube axial direction thereof. Here, the outer cover 15 is formed so that a height-wise dimension at the under-floor straight tube portion 31 and at the front and rear thereof becomes smaller than a height-wise dimension at the ends thereof (in other words, the outer cover 15 becomes thinner at the ends). The outer cover 15 is formed so that a widthwise dimension at the under-floor straight tube portion 31 and at the front and rear thereof becomes larger than a widthwise dimension at the ends thereof (in other words, the outer cover 15 is formed wider at the ends).

The differently shaped sections 23-25 which differ in shape in the tube axial direction of are formed on the outer cover 15 so as to deal with a routing space extending from the engine compartment 6 to the vehicle rear portion 7 through the underside of the vehicle floor 11. In this embodiment, although the differently shaped sections 23-25 are formed from the flexible tube portion 21 to the straight tube portion 22, the invention is not limited thereto. Namely, the differently shaped sections 23-25 may be formed only at the flexible tube portion 21 or the straight tube portion 22.

The differently shaped sections 23-25 are formed at the same time as the outer cover 15 is resin molded. Alternatively, the differently shaped sections 23-25 are formed after the outer cover 15 is resin molded, for example, by heating to collapse the outer cover 15 (in case the outer cover 15 is worked while it is being cooled immediately after having been resin molded, heating is not necessary as a matter of course). However, when the outer cover 15 is attempted to be resin molded into various shapes, many molds (which correspond to a mold block 67 of a fabricating apparatus 51 which will be described later) are necessary to be used. On the other hand, in the case of the latter method, since the differently shaped sections 23-25 are formed through the post-working, the differently shaped sections 23-25 can be formed to vary in shape, size and orientation in various ways without having to prepare many molds.

In the above description, the circular cross-sectional shape and the elliptic cross-sectional shape are raised as the cross-sectional shapes of the differently shaped sections 23-25. However, a rectangular cross-sectional shape or an oval cross-sectional shape may also be adopted.

According to the outer cover 15, the differently shaped sections 23-25 which differ in shape in the tube axial direction are contiguously formed thereon, this enabling the wire harness 9 to be arranged in such a way as to deal with a narrow space or a three-dimensional complex space, and therefore, the wire harness 9 can be arranged through even such a narrow space or three-dimensional complex space easily and in an ensured fashion. Additionally, according to the outer cover 15, since the corrugated flexible tube portions 21 and the rigid straight tube portions 22 having the straight shape are provided, the outer cover 15 can be bent at desired portion along the length thereof. Further, according to the outer cover 15, the regulation of routing of the wire harness 9 can be realized without using a routing regulating member such as a protector.

In FIG. 3, the high-voltage conduction path 16 includes two high-voltage circuits 32, a shielding member 33 covering the two high-voltage circuits 32 and a sheath 34 which is provided on an external side of the shielding member 33. This configuration of the high-voltage conduction path 16 is one of its configuration examples, and for example, a configuration may be adopted in which the high-voltage conduction path 16 does not include the sheath 34.

In this embodiment, the high-voltage circuit 32 is a known high-voltage electric wire and includes a conductor 35 and an insulator 36 covering the conductor 35. The high-voltage circuit 32 has a length necessary to realize a required electrical connection. The high-voltage circuit 32 is formed long because the wire harness 9 electrically connects the inverter unit 4 and the battery 5 (in other words, the junction block 12) (see FIG. 1).

The conductor 35 is made of copper or a copper alloy, or aluminum or an aluminum alloy. A conductor structure in which strands are twisted together into a conductor or a conductor structure in which a rod of a rectangular or circular cross section constitutes a conductor (a conductor structure in which for example, a flat angular core or round core constitutes a conductor, and in the case of this conductor structure being adopted, the wire itself is formed into a rod) may be adopted as the conductor structure of the conductor 35. The insulator 36 which is made from an insulating resin material is extruded over an outer surface of the conductor 35 which is configured as described above.

In this embodiment, although a known high-voltage electric wire is adopted as the high-voltage circuit 32, the invention is not limited thereto. Namely, a configuration may be adopted in which an insulator is provided on a known bus bar to form a high-voltage circuit.

The shielding member 33 is an electromagnetic shielding member covering the two high-voltage circuits 32 collectively (that is, a shielding member designed to deal with electromagnetic wave), and a known braid is adopted therefor which is made by interlacing a number of strands into a tubular shape. The shielding member 33 is formed so as to have the same length as an overall length of the two high-voltage circuits 32. The shielding member 33 is electrically connected to the shielding case (not shown) of the inverter unit 4 (see FIG. 1) via the shielded connector 17 (see FIG. 2) at one end portion.

As long as a countermeasure against electromagnetic wave can be incorporated, for example, a conductive metallic foil or a member containing this metallic foil may be adopted as the shielding member 33.

The sheath 34 is formed by extruding an insulating resin material over the outer surface of the shielding member 33 to a predetermined thickness and is disposed in a position which constitutes an outermost layer of the high-voltage conduction path 16. The sheath 34 is worked at ends thereof so as to allow the shielding member 33 to be exposed over a predetermined length in the fabrication process of the wire harness 9. The sheath 34 is worked to be slightly longer than, for example, the outer cover 15 after the ends thereof are worked in the way described above.

A known shielded wire (refer to reference numeral 44 in FIG. 6) is raised other than the high-voltage conduction path 16. One shielded wire or a plurality of shielded wires may be used. Alternatively, a high-voltage coaxial composite conduction path (not shown) is also raised so that a single cable has a positive circuit and a negative circuit coaxially or a single cable has three or more circuits coaxially.

At the differently shaped section 25 shown in FIG. 3, an outer surface of the high-voltage conduction path 16 is brought into surface contact with a flat inner surface 20 of the outer cover 15. Since the differently shaped section 25 has an elliptic cross section, the inner surface 20 of the outer cover thereat becomes flat. In relation to the surface contact of the high-voltage conduction path 16 with the flat inner surface 20, the following advantage will be provided. Namely, even though heat which is relatively high is generated as a result of the high-voltage conduction path 16 being energized, the heat is conducted efficiently to the outer cover 15 through the surface contact to thereby be dissipated from the outer surface 19.

Here, referring sequentially to FIGS. 4 to 7B, wire harnesses according to modified examples will be described.

First Modified Example

Figure 4:
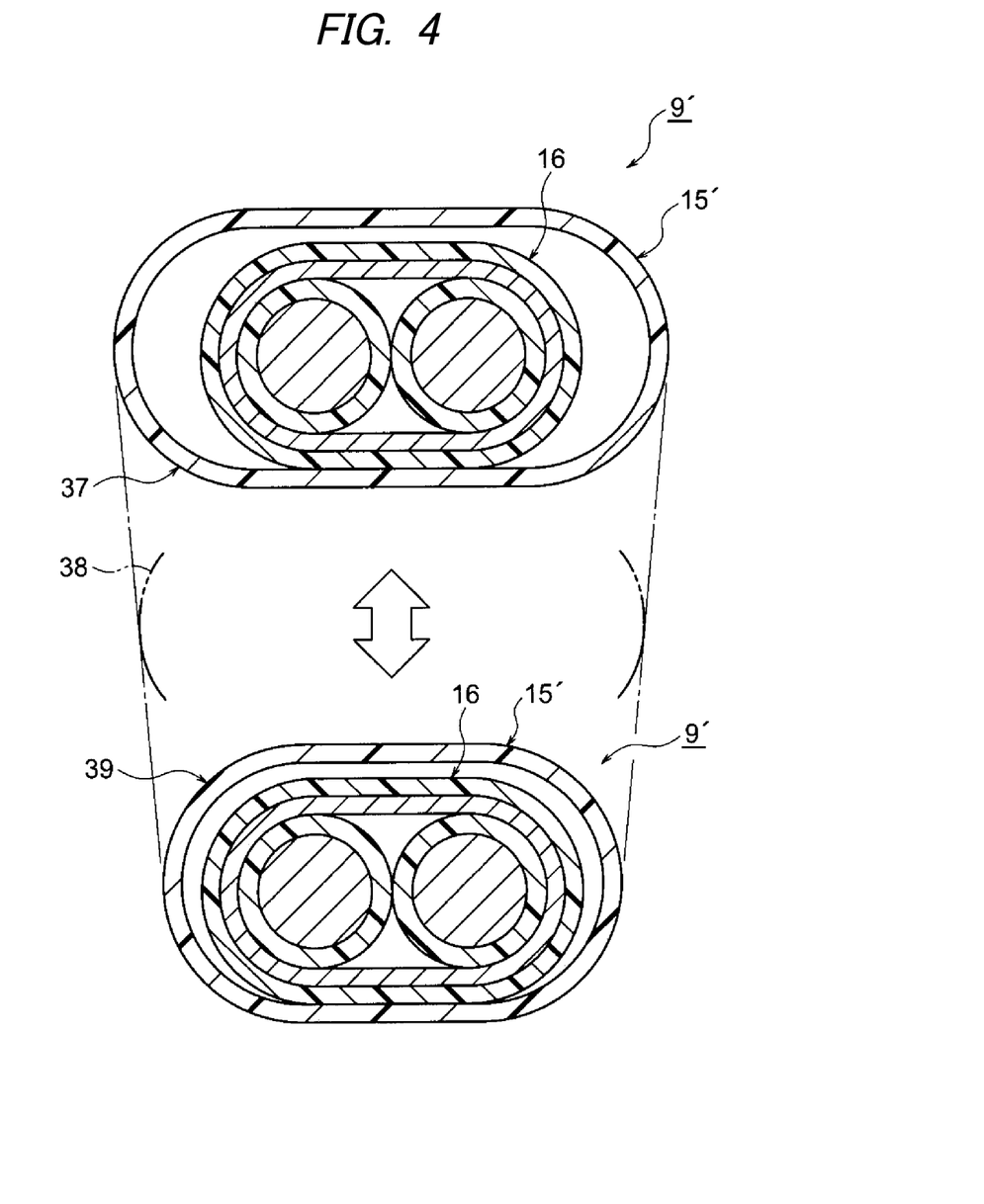
FIG. 4 is a schematic view showing schematically a change in cross section of a wire harness of a first modified example, as well as cross sections of differently shaped sections.

In FIG. 4, a wire harness 9' has an outer cover 15' and a high-voltage conduction path 16 similar to the high-voltage conduction path 16 described above which is accommodated in the outer cover 15' for protection. The outer cover 15' has differently shaped sections 37 to 39 contiguously formed along a tube axial direction.

The differently shaped sections 37 to 39 which differ in shape in the tube axial direction are contiguously formed so that their sizes differ in the tube axial direction. To describe this specifically, as shown in FIG. 4, the differently shaped section 37 is formed so as to have a circular cross section. The differently shaped section 38 is formed so as to have an elliptic cross section. This differently shaped section 38 is formed to a size which is a transition size from a larger size to a smaller size. Further, the differently shaped section 39 is also formed to have an elliptic cross section. This differently shaped section 39 is formed to the smaller size. In other words, the differently shaped sections 37 to 39 are formed so as to differ in size although they are formed flat.

Second Modified Example

Figure 5:
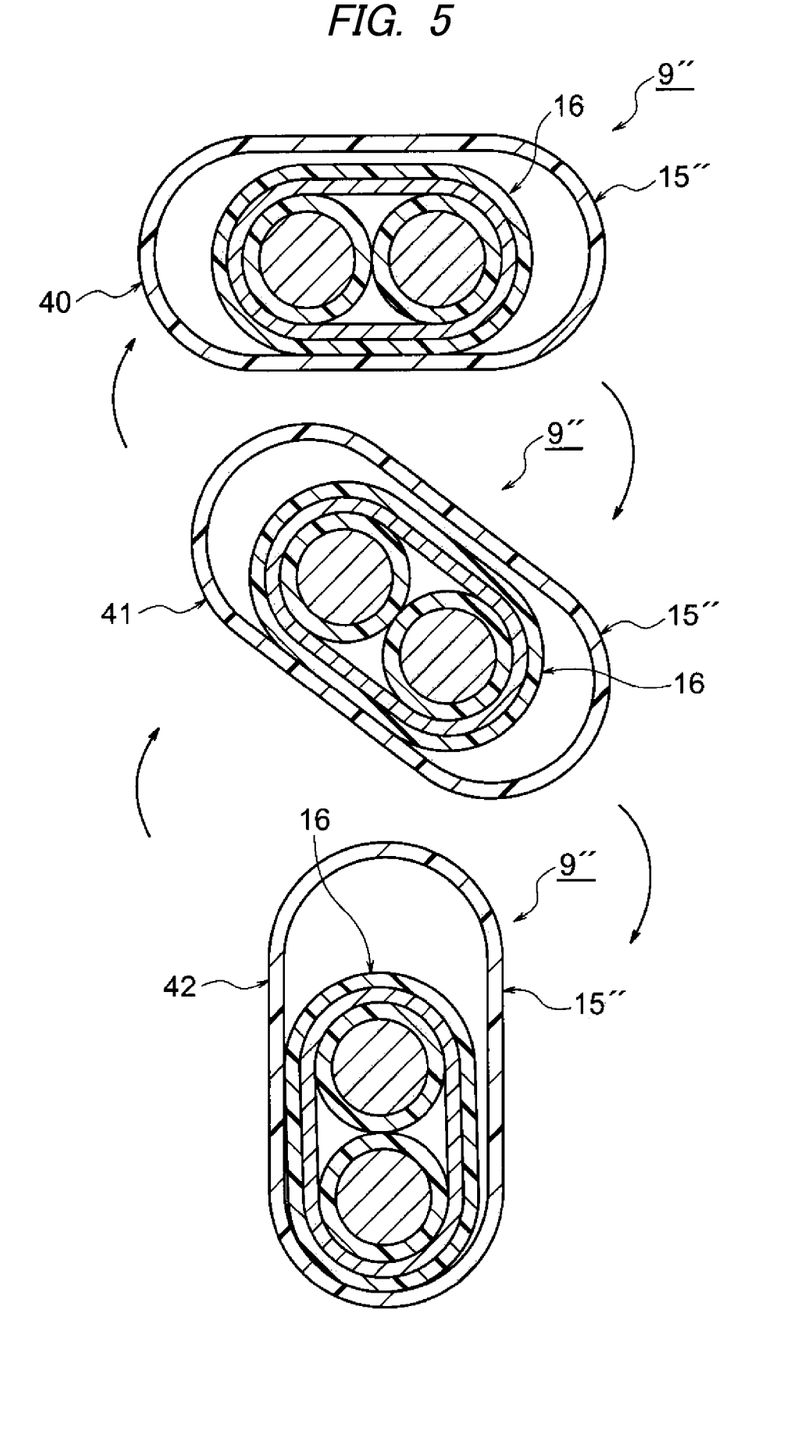
FIG. 5 is a schematic view showing schematically a change in cross section of a wire harness of a second modified example, as well as cross sections of differently shaped sections.

In FIG. 5, a wire harness 9" has an outer cover 15" and a high-voltage conduction path 16 similar to the high-voltage conduction path described above which is accommodated in the outer cover 15" for protection. The outer cover 15" has differently shaped sections 40 to 42 contiguously formed along a tube axial direction.

The differently shaped sections 40 to 42 which differ in shape in the tube axial direction are contiguously formed so that their orientations differ in the tube axial direction. To describe this specifically, as shown in FIG. 5, the differently shaped section 40 is formed to have an elliptic cross section and is formed horizontally elongated in FIG. 5. The differently shaped section 41 is also formed to have an elliptic cross section. This differently shaped section 41 is formed into a halfway twisted state which is a transition state from the horizontally elongated state to a vertically elongated state in the figure. Further, the differently shaped section 42 is also formed to have an elliptic cross section. This differently shaped section 42 is formed vertically elongated in FIG. 5. In other words, the differently shaped sections 40 to 42 are formed so as to differ in shape by being twisted to the different orientations although they are formed flat.

In relation to twisting the outer cover at the differently shaped sections, the invention is not limited to the twisting through substantially 90 degrees as shown in FIG. 5. The outer cover may be twisted through, for example, an acute angle.

In addition to this, in relation to a portion which is formed into a flat corrugated shape, there is provided an advantage that a deflecting direction (that is, a bending direction) can easily be changed by changing the orientation through twisting.

In the descriptions made by reference to FIGS. 4 and 5, although the differently shaped sections are formed to have the elliptic cross sections, the differently shaped sections may be formed to have a circular or rectangular cross section or an oval cross section. In the above descriptions, the differently shaped sections are formed to differ in shape by changing the size or orientation through twisting. However, the differently shaped sections may be formed to differ in shape by making the size differ while changing the cross-sectional shape, or by making the orientation differ through twisting while changing the cross-sectional shape, or by making the orientation differ through twisting while changing the size.

Third Modified Example

Here, in FIG. 6, the invention will be described as being applied to a high-voltage wire harness 8 which electrically connects the motor unit 3 and the inverter unit 4 (see FIG. 1).

The wire harness 8 is also called a motor cable and includes three shielded wires 43 (namely electrically-conducting paths) and a resin outer cover 44 accommodating the three shielded wires 43 which are inserted to extend therethrough for protection. The outer cover 44 has differently shaped sections 45-47 contiguously formed along an axial direction thereof.

The shielded wire 43 includes a conductor 35', an insulator 36' covering the conductor 35', a shielding member 33' covering the insulator 36' and a sheath 34' which is provided on an external side of the shielding member 33'.

The differently shaped sections 45-47 which differ in shape in the tube axial direction are formed as portions which are arranged in a narrow space or a three-dimensional complex space. The differently shaped sections 45-47 are contiguously formed along the tube axial direction such that their cross sections differ along the tube axial direction. To describe this specifically, as shown in FIG. 6, the differently shaped section 45 is formed to have a circular cross section. The differently shaped section 46 is formed to have a cross section which is a transition shape from the circular cross-sectional shape to an elliptic one (that is, from an elliptic sectional shape to a circular one). Further, the differently shaped section 47 is formed to have an elliptic cross section. In other words, the differently shaped section 45 is formed circular and the differently shaped section 47 is formed flat.

Figure 6:
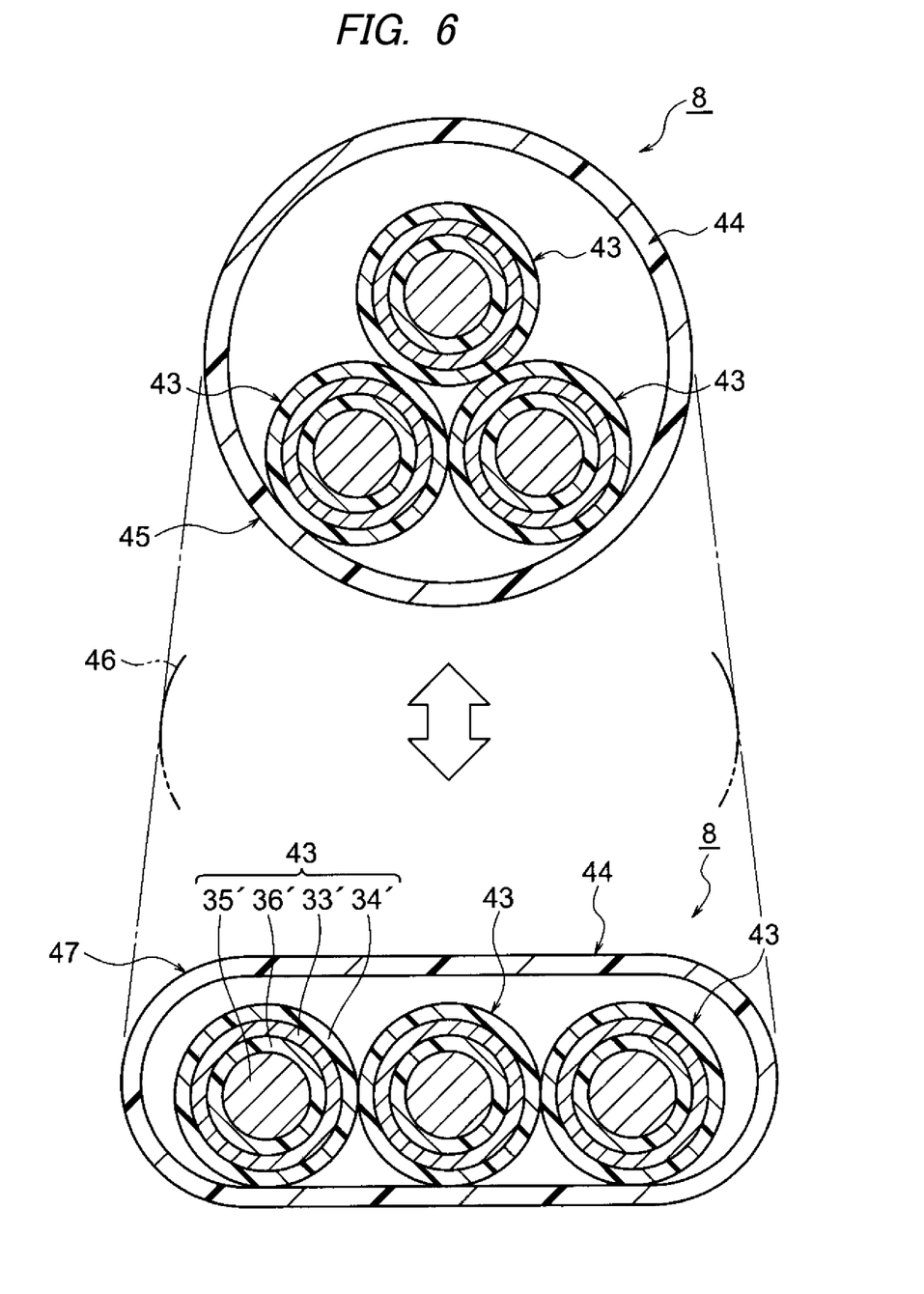
FIG. 6 is a schematic view showing schematically a change in cross section of a wire harness of a third modified example, as well as cross sections of differently shaped sections.

As shown in FIG. 6, the arrangement of the three shielded wires 43 can be changed so as to match the shapes of the differently shaped sections 45-47 by forming the differently shaped sections 45-47 on the outer cover 44. The height of the wire harness 8 can be reduced by changing the shape of the outer cover 4 from the circular shape to the flat shape. Consequently, it is possible to realize a reduction in height of the wire harness 8.

Fourth Modified Example

Figure 7A:
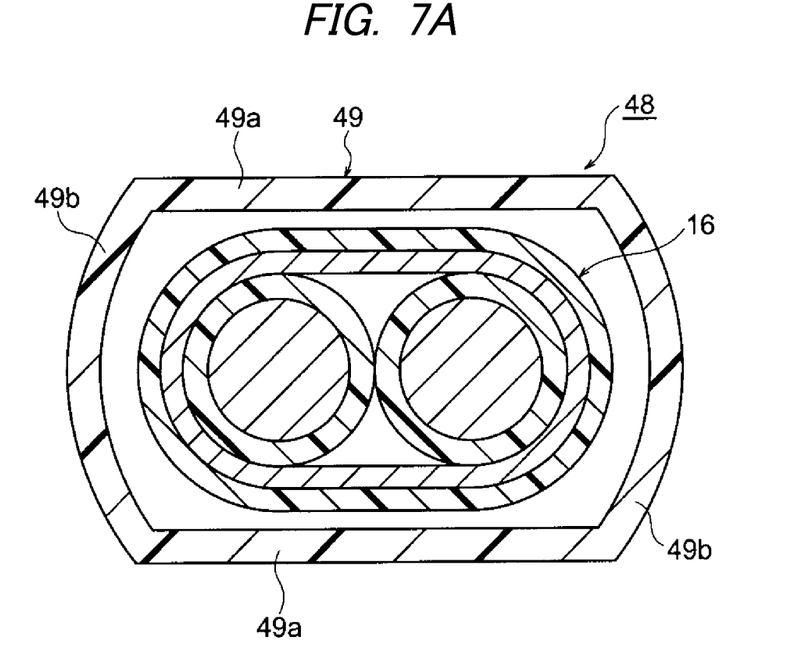
FIGS. 7A and 7B are views showing cross sections of a wire harness of a fourth modified example.
Figure 7B:
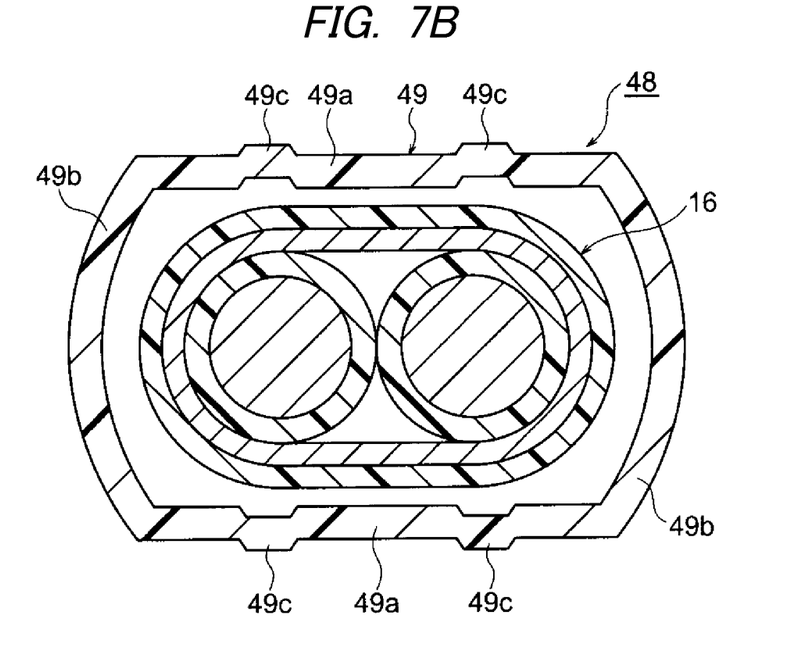

In FIG. 7A, a wire harness 48 in this modified example is such that an outer cover 49 is formed to have a substantially rectangular cross section. The outer cover 49 having the substantially rectangular cross section has a pair of long side wall portions 49a and a pair of short side wall portions 49b. When looking at cross sections shown in FIGS. 7A and 7B, the pair of long side wall portions 49a is formed so as to extend horizontally. On the other hand, the pair of short side wall portions 49b is formed so as to extend vertically while being curved slightly. With this cross-sectional shape, the wire harness 48 is strong with respect to a vertical internal force and is also strong with respect to a vertical external force. In FIG. 7B, reference numeral 49c denotes a rib (this rib being formed on a straight tube portion). These ribs 49c are formed as portions which enhance, for example, the rigidity of the wire harness 48. The formation of the ribs 49c is arbitrary.

The cross-sectional shapes shown in FIGS. 3B, 4, 5 and 6C may be substituted by the cross-sectional shapes shown in FIGS. 7A and 7B.

Fifth Modified Example

A wire harness according to a fifth modified example will be described while referring to the configuration thereof shown in FIG. 8A. FIG. 8B shows a comparison example with which the fifth modified example is compared.

Figure 8A:
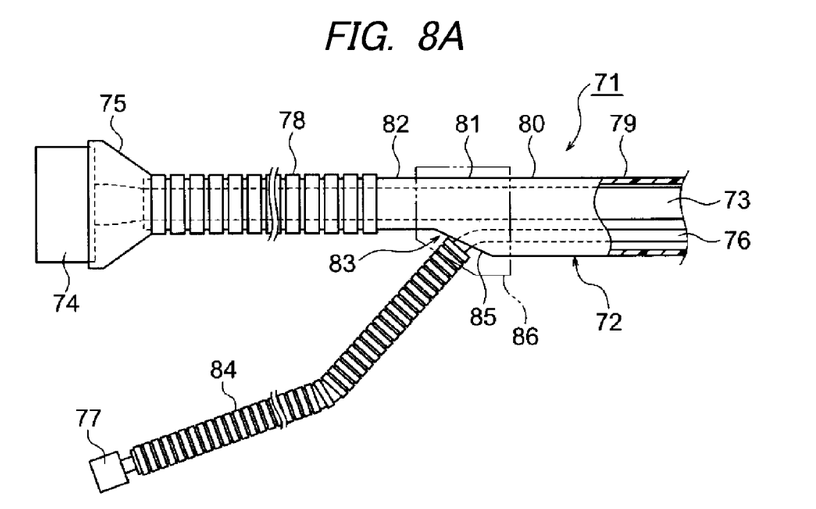
FIG. 8A is a view showing the configuration of a wire harness of a fifth modified example.
Figure 8B:
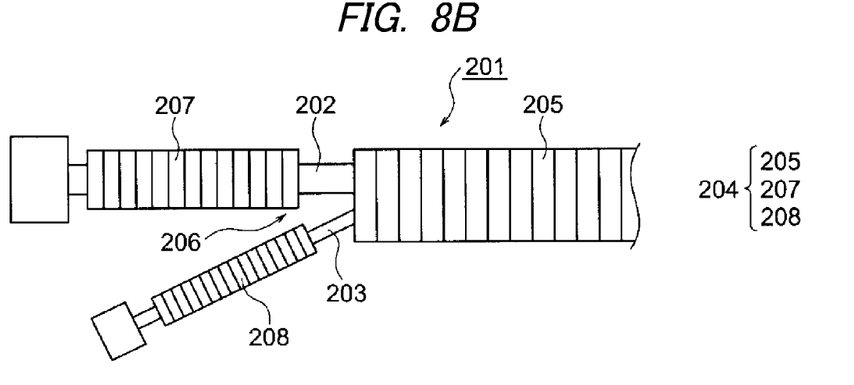
FIG. 8B is a view showing a comparison example to the fifth modified example.
Figure 9A:
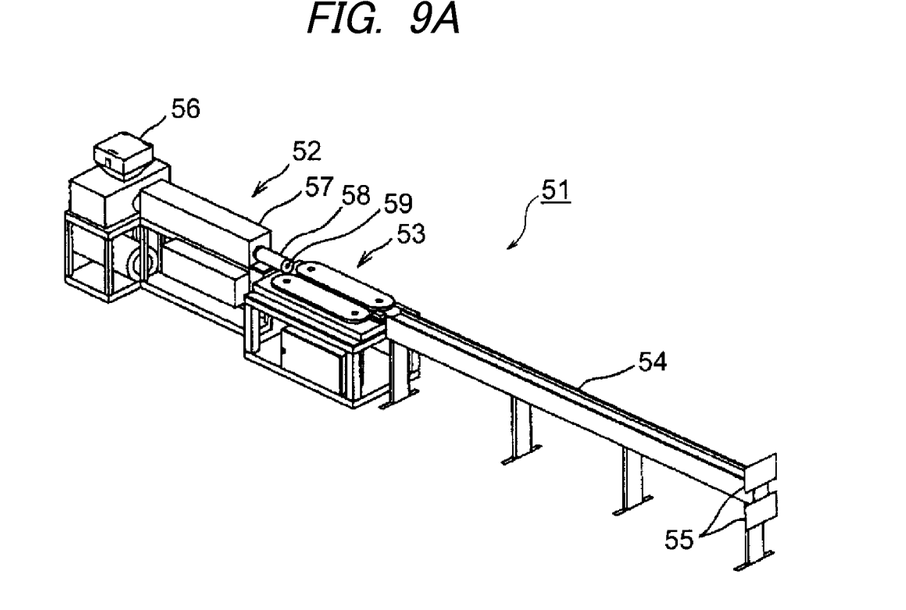
FIGS. 9A and 9B are views showing a fabricating apparatus for an outer cover.
Figure 9B:
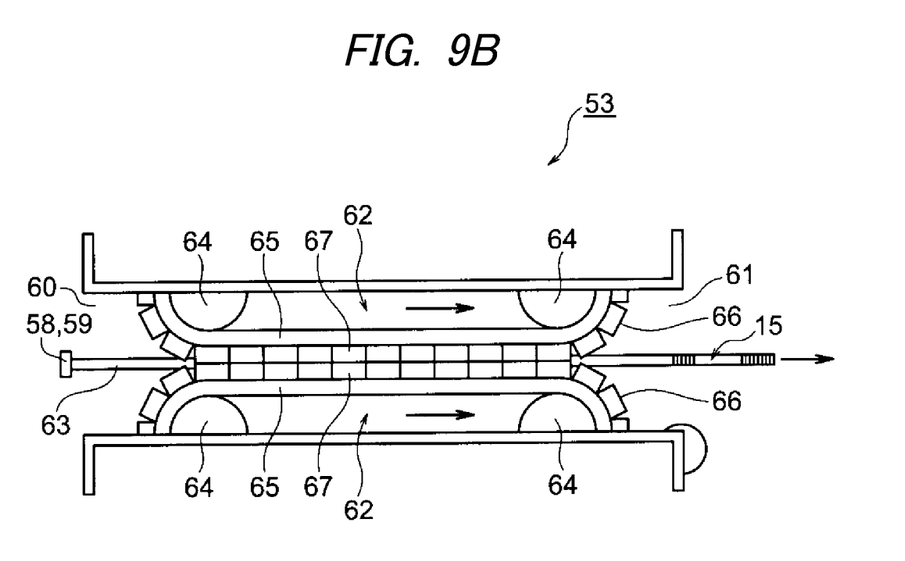

In FIG. 8A, a wire harness 71 includes an outer cover 72, a high-voltage conduction path 73 (that is, an electrically-conducting path), shielded connectors 74 and boots 75 which are provided at ends of the high-voltage conduction path 73, a low-voltage electrically-conducting path 76 (that is, an electrically-conducting path), and a connector 77 which is provided at an end of the low-voltage electrically-conducting path 76.

The outer cover 72 is formed into a shape shown in FIG. 8A which has a flexible tube portion 78 having flexibility, a straight tube portion 79 as a portion which is arranged straight and other flexible tube portions and straight tube portions. The outer cover 72 is also formed into the shape shown in FIG. 8A which has differently shaped sections 80-82 contiguously formed along a tube axial direction. Further, the outer cover 72 is also formed into the shape shown in FIG. 8A which has a branching portion 83 to divide the electrically-conducting paths at an intermediate portion of the differently shaped sections 80-82 (that is, the intermediate portion being the differently shaped section 81 in the example shown in FIG. 8A). The outer cover 72 has a branched side protecting tube portion 84 extending from the branching portion 83.

The outer cover 72 is made up of two parts; a flexible tube portion 78 and a straight tube portion 79 which are formed integrally and the branched side protecting tube portion 84.

The differently shaped sections 80-82 which differ in shape in the tube axial direction are contiguously formed so as to differ in size in the tube axial direction at the straight tube portion 79. To describe this specifically, the differently shaped section 80 is formed to have an elliptic cross section and is formed in a large size. The differently shaped section 81 is also formed to have an elliptic cross section. This differently shaped section 81 is formed in a transition size from the large size to a small size. Further, the differently shaped section 82 is also formed to have an elliptic cross section. This differently shaped section 82 is formed in a small size. In other words, the differently shaped sections 80-82 are formed to differ in size although they are formed flat. The cross-sectional shapes of these differently shaped sections 80-82 described above are one of examples which they can take.

The differently shaped section 80 is formed as a portion accommodating the high-voltage conduction path 73 and the low-voltage electrically-conducting path 76 for protection. The differently shaped section 82 and the flexible tube portion 78 are formed as a portion which accommodates only the high-voltage conduction path 73 for protection.

The branching portion 83 is formed so as to be disposed at an inclined portion 85 of the differently shaped section 81. An opening portion, not shown, is formed in, for example, a middle position of the inclined portion 85. The opening portion is formed as a portion from which the low-voltage electrically-conducting path 76 is pulled out. The opening portion is formed by using an appropriate working method. An automated working method is preferred as a method by which the inclined portion 85 is worked to form the opening portion.

The branching portion 83 is formed by forming the flexible tube portion 78 and the straight tube portion 79 in a seamless manner.

The branched side protecting tube portion 84 is formed as a portion accommodating the low-voltage electrically-conducting path 76 which is pulled out from the opening portion as a branch line for protection. The branched side protecting tube portion 84 is formed into a flexible tube portion which can be bent at any portion along the length thereof.

Reference numeral 86 denotes a tape wrapped portion. This tape wrapped portion 86 is formed by winding a tape in such a way as to leave no gap on the periphery of the branching portion 83. The formation of the tape wrapped portion 86 is arbitrary.

According to the wire harness 71 described heretofore, the branching of the electrically-conducting path can be facilitated by making use of the intermediate portion of the differently shaped section 81.

According to the wire harness 71, in relation to the outer cover 72, the branching of the electrically-conducting path can be dealt with by a small number of configurations. This feature will be described in greater detail.

In FIG. 8B, in a wire harness 201 which is a comparison example to be compared with the fifth modified example, an outer cover 204 is made up of three parts in causing a low-voltage electrically-conducting path 203 to branch off from a bundle of a high-voltage conduction path 202 and the low-voltage electrically-conducting path 203 as a branch line.

Specifically, the outer cover 204 is made up of three parts, that is, a corrugated tube 205 having a large diameter and configured to accommodate the high-voltage conduction path 202 and the low-voltage electrically-conducting path 203 for protection, a corrugated tube 207 having a middle diameter and configured to accommodate only the high-voltage conduction path 202 which is pulled out from a branching portion 206 for protection and a corrugated tube 208 having a small diameter and configured to accommodate only the low-voltage electrically-conducting path 203 for protection which is pulled out from a branching portion 206 for protection.

Consequently, when comparing FIG. 8B with FIG. 8A, the outer cover 72 of the wire harness 71 can deal with the branching of the electrically-conducting path with a small number of configurations.

(Fabrication Method for Outer Cover)

In FIGS. 9A and 9B, reference numeral 51 denotes a fabrication apparatus for resin molding, for example, an outer cover 15 (see FIG. 2). This fabrication apparatus 51 (that is, a resin molding apparatus) includes a resin extruding unit 52, a molding unit 53, a cooling unit 54, and a cutting unit 55.

The molding unit 53 continues to a downstream side of the resin extruding unit 52. The cooling unit 54 continues to a downstream side of the molding unit 53. The cutting unit 55 is provided at an end of the cooling unit 54 (that is, the cutting unit 55 is disposed at an end of the fabrication apparatus) and is activated to operate in cutting an outer cover 15 to a predetermined length.

The resin extruding unit 52 includes a hopper 56 which functions as a portion into which a resin material is introduced, an extruding unit main body 57 which continues to the hopper 56 and extends in a horizontal direction, and a die 58 which projects from an end portion of the extruding unit main body 57. The die 58 has a resin material extruding opening 59, and this resin material extruding opening 59 is disposed within an entrance 60 to the molding unit 53.

The molding unit 53 constitutes a portion configured to mold the resin material in a straight line from the entrance 60 to an exit 61 and has a pair of mold structure portions 62.

The pair of mold structure portions 62 is disposed on left- and right-hand sides of a soft, cylindrical resin material 63 (that is, a resin material) which is let out from the resin material extruding opening 59 of the die 58. The pair of mold structure portions 62 is configured to mold the resin material 63 into a predetermined shape.

The mold structure portions 62 each include a pair of timing pulleys 64 which are disposed along a traveling direction of the resin material 63, an endless belt 65 which is caused to travel in a direction indicated by an arrow in FIG. 9B by the pair of timing pulleys 64, and a mold block assembly 66 which is attached to the endless belt 65 to move together therewith.

The mold block assembly 66 has a plurality of mold blocks 67. The mold blocks 67 are aligned with no gap defined therebetween at a straight line portion of the endless belt 65. The mold blocks 67 are fixed to the endless belt 65 so as to be replaced by other mold blocks 67.

The mold blocks 67 are moved by the endless belt 65. By opening the mold blocks 67, individual portions of an outer cover 15 which are molded into predetermined shapes are pushed out in a direction indicated by an arrow in FIG. 9B. As this occurs, in the outer cover 15, differently shaped sections 23-25 (see FIG. 2) which differ in shape in the tube axial direction are contiguously formed. As has been described above, the differently shaped sections 23-25 may be formed through post-working.

The fabrication apparatus 51 and the fabrication method described above are one of examples that the invention can take. In addition to those described above, for example, a blow-type fabrication apparatus and a blow-type fabrication method will be adopted without any problem.

Thus, as has been described heretofore by reference to FIGS. 1 to 9B, according to the invention, it is possible to provide the wire harness 9 (9', 9", 8) that addresses the routing space and the routing regulation.

To implement the present invention, various changes may of course be made without departing from the scope of the invention.

Hereinafter, the wire harness according to the embodiment will be summarized.

(1) The wire harness (9, 9', 9", 8, 48, 71) according to the embodiment includes the plurality of lines or circuits of electrically-conducting paths (16, 43, 73, 76), and the tube-shaped outer cover (15, 15', 15", 44, 49, 72) in which the electrically-conducting path is inserted and which protects the electrically-conducting path so extending therein. The outer cover is made of resin and includes the flexible tube portion (21, 78) having the flexibility and the straight tube portion (22, 79) which is the portion arranged in the straight line. At least one of the flexible tube portion and the straight tube portion has the plurality of differently shaped sections (23-25, 37-42, 45-47, 80-82) contiguously formed along the tube axial direction.

(2) In the wire harness (9, 9', 9", 8, 48, 71) according to the embodiment, the differently shaped sections (23-25, 37-42, 45-47, 80-82) are configured to be different in one or a combination of two or more of a cross-sectional shape, size and twisted orientation.

(3) In the wire harness (9, 9', 9", 8, 48, 71) according to the embodiment, the differently shaped sections (23-25, 37-42, 45-47, 80-82) may be formed after the electrically-conducting paths (16, 43, 73, 76) are inserted through the outer cover (15, 15', 15", 44, 49, 72).

(4) In the wire harness (9, 9', 9", 8, 48, 71) according to the embodiment, the differently shaped sections (23-25, 37-42, 45-47, 80-82) may be formed before the electrically-conducting paths (16, 43, 73, 76) are inserted through the outer cover (15, 15', 15", 44, 49, 72).

(5) In the wire harness (71) according to the embodiment, the outer cover (72) has the branching portion (83) to branch off the electrically-conducting path (76) at the intermediate portion of the differently shaped sections (80-82).

(6) In the wire harness (71) according to the embodiment, the outer cover (72) includes further the branched side protecting tube portion (84) extending from the branching portion (83).

(7) In the wire harness (9, 9', 9", 8, 48, 71) according to the embodiment, the electrically-conducting paths (16, 43, 73, 76) are configured in an elongated manner to be arranged under the vehicle floor 11 to extend from a front to a rear of the vehicle floor, and the outer cover (15, 15', 15", 44, 49, 72) is configured to have a length that corresponds to the electrically-conducting paths (16, 43, 73, 76).

What is claimed is:

1. A wire harness comprising:
   a plurality of lines or circuits of electrically-conducting paths, and
   a tube-shaped outer cover in which the electrically-conducting paths are inserted to protect the electrically-conducting paths,
   wherein the outer cover is made of resin and comprises a flexible tubular portion having flexibility and a rigid straight tubular portion, which is arranged in a straight line manner, the flexible tubular portion being more flexible than the rigid straight tubular portion,
   wherein the outer cover is formed with no slit extending in an entire length of the outer cover along an axial direction,
   wherein the rigid straight tubular portion has a flat shape portion and comprises a plurality of differently shaped sections contiguously formed along the axial direction, the differently shaped sections being different in a twisted orientation of the flat shape portion,
   wherein the outer cover comprises a branching portion to divide the electrically-conducting paths at an intermediate portion of the differently shaped sections,
   wherein the wire harness further comprises a second straight tubular portion that is contiguous with the flexible tubular portion and another flexible tubular portion and non-contiguous with the branched portion, and
   wherein the rigid straight tubular portion comprises a pair of ribs formed on an outer surface of the flat shape portion in an axial direction along the length of the flat shape portion.

2. The wire harness according to claim 1, wherein at least one of the differently shaped sections has a circular cross section and at least one of the differently shaped sections has an elliptic cross section.

3. The wire harness according to claim 1, wherein the outer cover further comprises a branched side protecting tubular portion extending from the branching portion.

4. The wire harness according to claim 1,
   wherein the electrically-conducting paths are configured in an elongated manner to be arranged under a floor of a vehicle to extend from a front to a rear of the floor of the vehicle, and
   wherein the outer cover is configured to have a length that corresponds to the electrically-conducting paths.

5. The wire harness according to claim 1, wherein the flexible tubular portion and the rigid straight tubular portion are integrally resin molded.

6. A wire harness comprising:
   a plurality of lines or circuits of electrically-conducting paths, and
   a tube-shaped outer cover in which the electrically-conducting paths are encapsulated to protect the electrically-conducting paths, the outer cover being made of resin and formed with no slit extending in an entire length of the outer cover along an axial direction, the outer cover comprising:
     a plurality of flexible tubular portions having flexibility; and
     a plurality of rigid straight tubular portions, each straight tubular portion being arranged in a straight manner,
   wherein the flexible tubular portions are more flexible than the rigid straight tubular portions, at least one of the rigid straight tubular portions has a flat shape portion and comprises a plurality of differently shaped sections contiguously formed along the axial direction, the differently shaped sections of the at least one of the flexible tubular portions being different in a twisted orientation of the flat shape portion,
   wherein the outer cover comprises a branching portion to divide the electrically-conducting paths at an intermediate portion of the differently shaped sections,
   wherein the wire harness further comprises a second straight tubular portion that is contiguous with the flexible tubular portion and another flexible tubular portion and non-contiguous with the branched portion, and
   wherein the rigid straight tubular portion comprises a pair of ribs formed on an outer surface of the flat shape portion in an axial direction along the length of the flat shape portion.

7. The wire harness according to claim 6, wherein the flexible tubular portions and the straight tubular portions are disposed continuously in an alternating fashion in the axial direction.

8. The wire harness according to claim 7, wherein the flexible tubular portions and the straight tubular portions are integrally resin molded.

9. The wire harness according to claim 6, wherein the outer cover further comprises a branched side protecting tubular portion extending from the branching portion.

10. The wire harness according to claim 6, wherein the outer cover further comprises a branched side protecting tubular portion extending from the branching portion.

11. The wire harness according to claim 6, wherein at least one of the straight tubular portions is non-contiguous with the branched portion.

* * * * *